United States Patent [19]

Fujita et al.

[11] Patent Number: 5,331,630
[45] Date of Patent: Jul. 19, 1994

[54] RENEWAL METHOD AND APPARATUS FOR AU-4 AND TU-3 POINTERS OF SYNCHRONOUS DIGITAL HIERARCHY

[75] Inventors: Yoshitaka Fujita; Keiichi Tsuda, both of Tokyo, Japan

[73] Assignee: Nec Corporation, Tokyo, Japan

[21] Appl. No.: 917,409

[22] Filed: Jul. 23, 1992

[30] Foreign Application Priority Data

Jul. 31, 1991 [JP] Japan ................................ 3-192329

[51] Int. Cl.[5] .............................................. H04J 3/07
[52] U.S. Cl. ..................................... 370/58.1; 370/84; 370/102; 370/105.1; 370/112
[58] Field of Search ...................... 370/96.1, 96.2, 53, 370/58.1, 60, 60.1, 68.1, 17, 110.3, 112, 94.1, 100.1, 84, 66, 95.1, 102, 105.1, 110.1

[56] References Cited

U.S. PATENT DOCUMENTS

| | | | |
|---|---|---|---|
| 4,967,405 | 10/1990 | Upp et al. | 370/112 |
| 4,998,242 | 3/1991 | Upp | 370/60 |
| 5,040,174 | 8/1991 | Takeuchi et al. | 370/60 |
| 5,123,010 | 6/1992 | Pospischil | 370/58.1 |
| 5,168,494 | 12/1992 | Mueller | 370/79 |
| 5,172,376 | 12/1992 | Chopping et al. | 370/105.1 |

OTHER PUBLICATIONS

CCITT Blue Book Recommendations, COM XVIII-R 33-E, revised Jun. 1990, pp. 18-100.

*Primary Examiner*—Douglas W. Olms
*Assistant Examiner*—Huy D. Vu
*Attorney, Agent, or Firm*—Sughrue, Mion, Zinn, Macpeak & Seas

[57] ABSTRACT

Pointer renewal apparatus for AU-4 and TU-3 at an NNI of SDH recommended by CCITT, G707-G709. The apparatus comprises a retiming block 1 for input data, a pointer-detecting block 2 for the TU-3 pointer from input data, a pointer-analyzing block 4, a main memory block 6 for storing input data in a block frame of STM-⅓, a new pointer-generating block 8 which combines the AU-4 pointer and TU-3 pointer received into a new TU-3 pointer, a pointer-changing and output data block 7, and blocks which supply necessary pulses and signals such as extracting pulses for extracting the TU-3 pointer from the input data-block 3, generating frame-head signal pulses for the stored data-block 5, output timing pulses for the AU-4 pointer and TU-3 pointer-block 9, pulses and alarm signals indicating loss of a pointer and alarm indication signals AIS, and a read/write error-block 10.

1 Claim, 4 Drawing Sheets

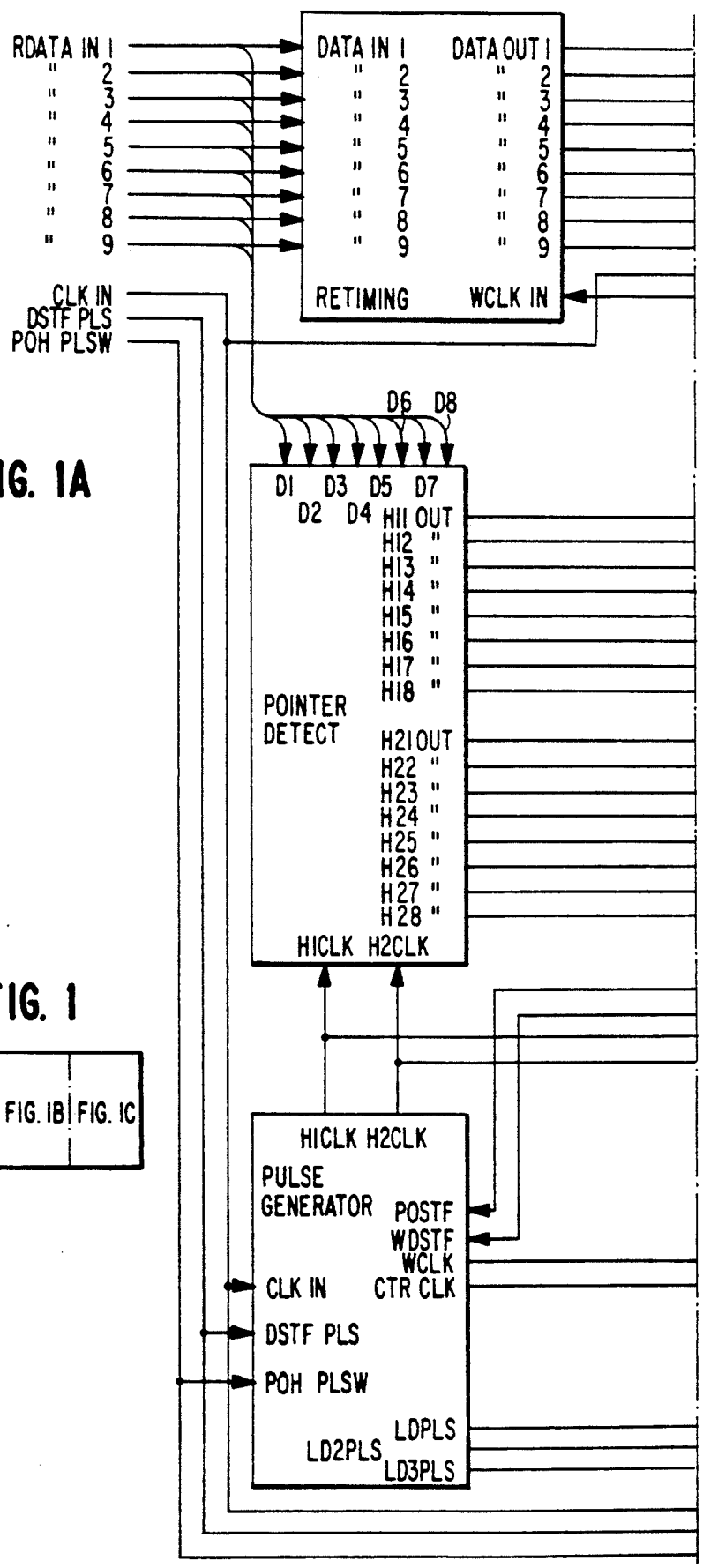

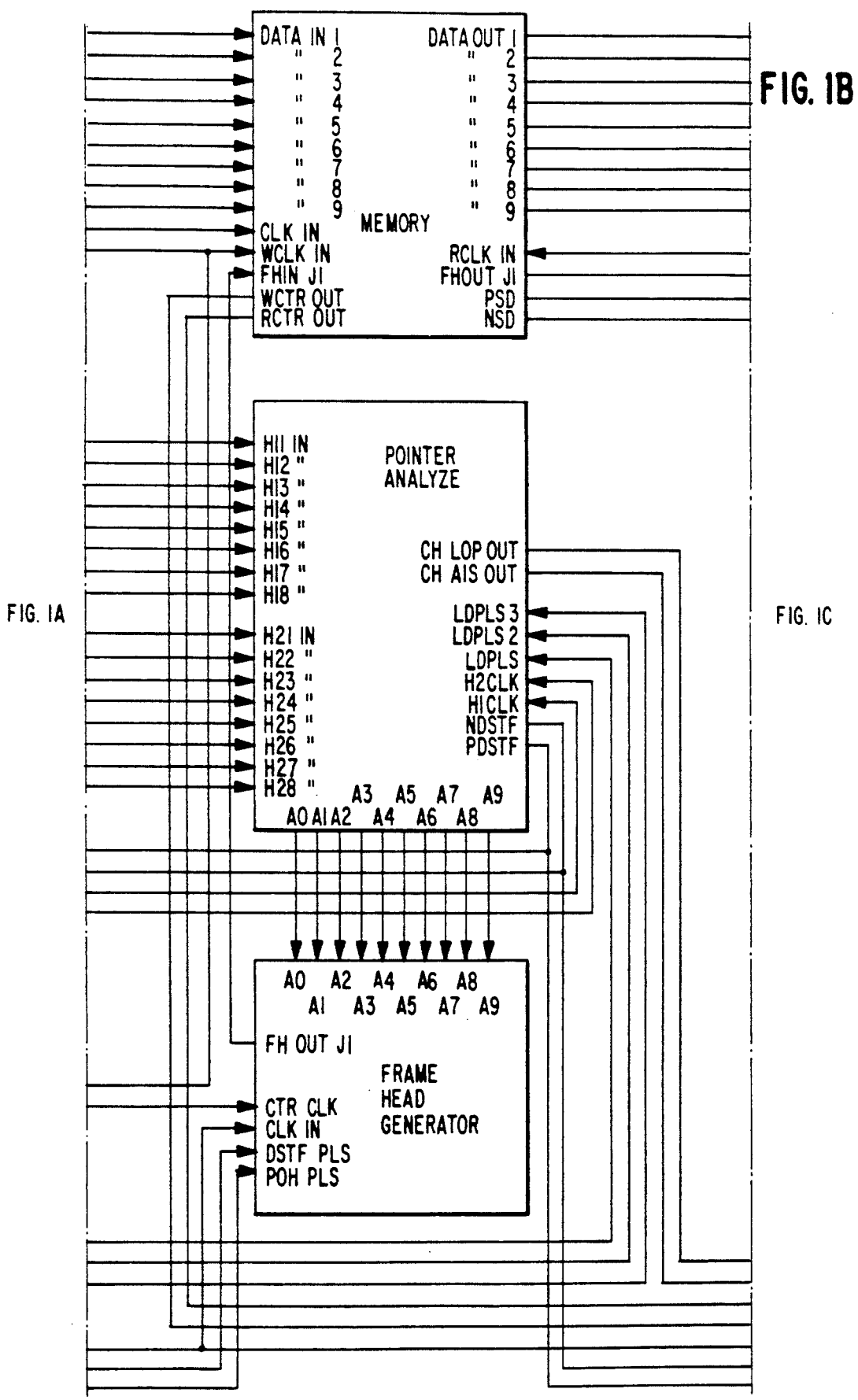

RENEWAL METHOD AND APPARATUS FOR AU-4 AND TU-3 POINTERS OF SYNCHRONOUS DIGITAL HIERARCHY

BACKGROUND OF THE INVENTION

1. Field of the Invention

The present invention relates to a digital transmission system, and more particularly to a processing method and apparatus for a Network Node Interface (NNI) for Synchronous Digital Hierarchy (SDH) specified by the recommendations of the International Telegraph and Telephone Consultative Committee (CCITT).

2. Description of the Related Art

The Recommendations G702, G707, G708, G709 of CCITT specify a multiplexing method and its details for a Synchronous Digital Hierarchy (SDH) and Network Node Interface (NNI) for multiplexing various digital communications networks from bit rates of 1544 kbit/s, 2048 kbits/s, 6312 kbit/s, 34368 kbit/s, 44736 kbit/s, and 139264 kbits/s to bit rates of 155.52 Mbit/s or higher (CCITT BLUE BOOK Recommendations G707, G708, G709, 1989, revised 1990).

The SDH is composed of hierarchical elements which are arranged from lower to higher levels, as follows:

Container (C-n, n=1–4) which is composed of information payload comprising a synchronizing information signal of 1.5 Mbit/s through 139 Mbit/S;

Virtual Container (VC-n) of lower order (n=1, 2) or higher order (n=3, 4) that adds a Path Overhead (POH) as control information to the Container (C-n) and is mapped in one block frame;

Tributary Unit (TU-n, n=1, 2, 3) which includes the lower order VC in a floating manner and is aligned by the addition of a pointer (TU pointer) indicating the offset of the payload frame start;

Tributary Unit Group (TUG-2, 3, 4) in which plural TU-1, 2 or one TU-3 multiplexed in higher order VC-3, 4 is mapped in fixed location;

Administrative Unit (AU-n, n=3, 4) which comprises information payload composed of higher order VC-3 or VC-4 with plural TUGs and higher order C-3, 4 multiplexed therein, and a pointer (AU pointer) indicating the offset of the payload frame start relatively to the multiplex section frame start; and Synchronous Transport Module (STM-n, n=1, 4, 16) which is composed of an AU group (AUG) as information payload with one or more AU-n multiplexed therein and is mapped in one block frame of 9 rows and $261 \times n$ columns with the addition of Section Overhead (SOH), the STM being repeated every 125 microseconds.

A basic STM, which is termed STM-1, is composed of 9 rows by 270 columns and defined at 155520 kbit/s.

In the whole process of multiplexing and transmitting each Container as STM-1 and separating received STM-1 into each Container, each NNI must renew the AU pointer to the TU pointer when a cross-connection is to be made with respect to each VC, but this process is not defined in the Recommendations.

Heretofore, such pointer renewal has been carried out as follows: All STM-1 signals having respective AU pointers are demultiplexed into signals each including lower order VC, i.e., the signals are rearranged with VCs as channels.

Thereafter, each respective offset, i.e., each TU pointer, is added to the VC channels, and they are multiplexed into TU-n signals providing higher order VC-3 or VC-4. Each AU pointer is then added to produce AU signals. Finally, SOH is added to the AU signals to provide the STM-1 signal.

Since the demultiplexing and multiplexing processes for the cross-connection are required for all levels from the lowest to the highest levels, conventional pointer renewal has been time-consuming, and the delay time caused by pointer renewal has been long.

SUMMARY OF THE INVENTION

In view of the aforesaid drawback of conventional pointer renewal, it is an object of the present invention to provide a method of and apparatus for renewing the AU-4 pointer and TU-3 pointer at a high-order level in order to shorten the delay time which is caused when a cross-connection is made.

According to the present invention, there is provided a method of renewing the pointers of a network node interface for STM-1 signals received from N directions in a synchronous digital hierarchy, effecting a cross-connection between the received STM-1 signals and an asynchronous signal transmitted from a local station at a rate of 34 Mbit/s or lower, on a VC signal level, and transmitting the signals as STM-1 signals. The method comprises the steps of demultiplexing each of the N received STM-1 signals into three STM-⅓ signals each composed of 9 rows×90 columns, including an AU pointer of 3 bytes, SOHs in 8 rows×3 columns and a payload in a TU-3 format in 9 rows×87 columns, multiplexing or mapping the asynchronous signal into three signals having the same format as the STM-⅓ signals, storing the total of 3×(N+1) STM-⅓ signals in a single memory module, renewing a TU-3 pointer by replacing positive or negative stuff indicated by AU pointers of the respective STM-⅓ signals stored in the memory module with positive or negative stuff of TU-3 level, renewing the pointers of the respective STM-⅓ signals with all of the AU pointers being set to a constant value K within a range from 0 to 782 and multiplexing the STM-⅓ signals with the STM-1 signals for transmission.

Accordingly, even if the values of the AU pointers of the STM-⅓ signals including TU-3 signals received are floating in the STM-⅓ signals and are different from each other, when the signals are transmitted, the locations of J1, which are the first locations in the TU-3 signals, are indicated as a constant value K in the AU pointers, and the values of H1 and H2 are renewed with the location of A1 of fixed phase contained in SOH at each starting end. The delay time required by the cross-connection in the network node interface can be shortened for outputting data.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 1, 1A, 1B and 1C are block diagrams of an apparatus according to the present invention.

DETAILED DESCRIPTION OF THE PREFERRED EMBODIMENT

Figure 1C:
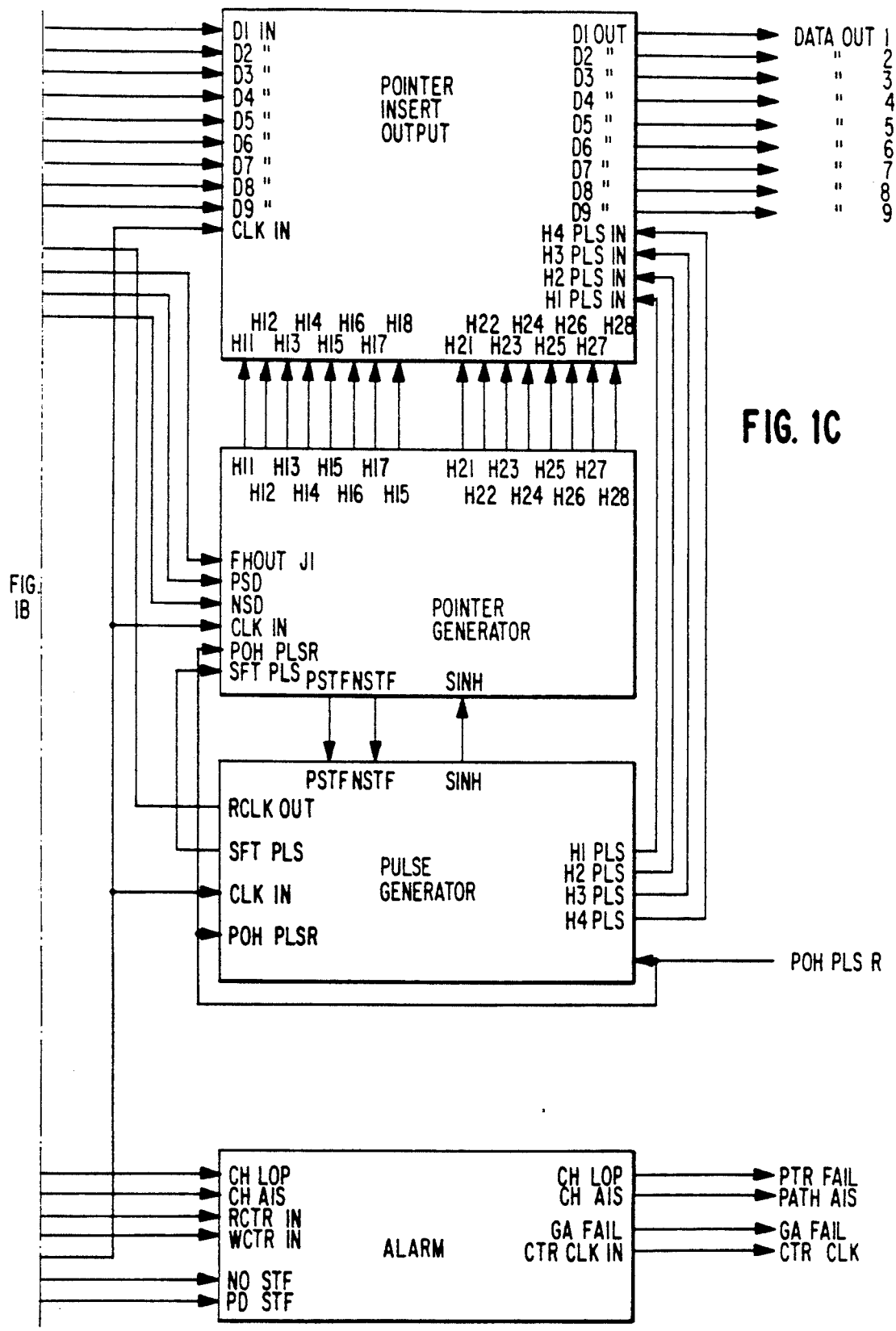

As shown in FIG. 1, an apparatus according to the present invention comprises 10 blocks, i.e., a retiming block 1, a detecting block 2 for detecting H1, H2 bytes of a TU-3, a block 3 for generating a first pulse, a block 4 for analyzing input TU-3 pointers, a block 5 for generating a frame head signal, a main memory block 6, a block 7 for inserting pointers H1 and H2 of the TU-3, a block 8 for generating pointers H1 and H2 of the TU-3, a block 9 for generating a second pulse, and an alarm block 10. Data of STM-⅓ are applied as parallel data including parity data over 9 signal lines to the apparatus, i.e., the retiming block 1, at a rate of 6.48 Mbit/s. In addition, the apparatus is supplied with other pulses including clock pulses at the rate of 6.48 Mbit/s, stuff-detecting DSTF pulses in the form of an active low for the positive or negative stuff portion generated at an SOH byte and an AU pointer contained in STM-1, and POH pulses in the form of an active low for the J1 portion of the STM-1 signal in the AU pointer.

Figure 2:
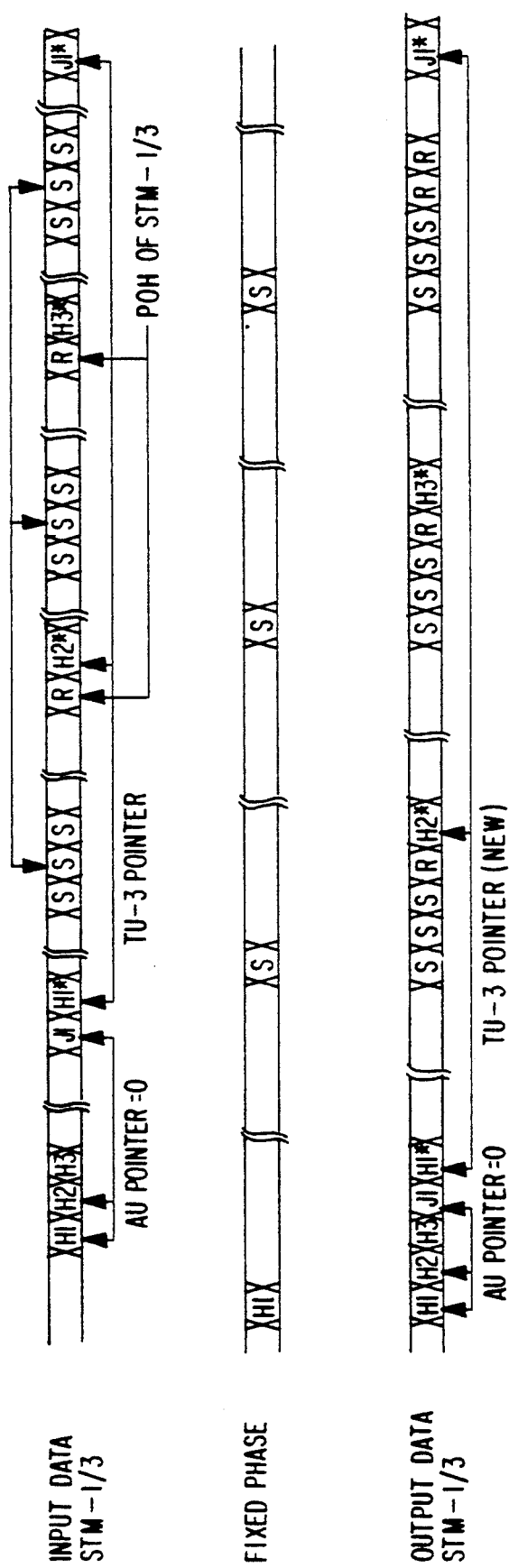
FIG. 2 is a timing chart of the operation of the apparatus shown in FIG. 1.

The operation of the apparatus shown in FIG. 1 and FIG. 2 will be described below.

In response to the clock pulses, the DSTF pulses, and POH pulses supplied to block 3, block 3 generates H1 and H2 clock pulses for extracting the H1 and H2 pointers (indicated as H1*, H2* in FIG. 2 to distinguish them from the AU pointer) including pointers of TU-3, and control clock pulses for controlling blocks 4 and 5.

Based on the H1 and H2 clock pulses from block 3, block 2 removes H1 and H2 bytes of TU-3 from the data which is supplied thereto at the same time that it is supplied to block 1 and sends the H1 and H2 bytes to block 4. Based on the supplied H1 and H2 bytes, block 4 analyzes the values of the pointers and detects the positive/negative stuff, the alarm signals such as LOP, AIS, etc., and outputs the detected results as demand signals of positive/negative stuff of PDSTF, NDSTF, CHLOP OUT, and CHAIS OUT pulses. Block 4 also outputs address information A0–A9 indicative of the location of the J1 of TU-3 which is detected upon analysis of the pointer values, to block 5.

The data supplied over the nine lines to block 1 are retimed by D flip-flops, and sent to block 6 after the TU-3 pointers have been analyzed by block 4.

In block 6, the positive stuff and the negative stuff in the AU pointer are absorbed as H1, H2 and H3 bytes of the TU pointers. When the AU pointer is outputted, the supplied data is transmitted at all times as a predetermined value K, which is "0" in this case, to block 7 from nine data output terminals DATA OUT 1 through 9. At this time, the J1 pulse written by block 5 and positive and negative demand pulses PSD and NSD of TU-3 which are generated by block 6 are transmitted to block 8.

In block 8, a counter for calculating the TU-3 pointer repeatedly counts values ranging from 0 to 764. When an FH OUT J1 pulse is sent from block 6 to block 8, the counter is reset to "0." When supplied with the positive and negative demand pulses PSD, NSD, block 8 analyzes and transmits them as positive/negative stuff PSTF/NSTF information to block 9. Once the stuffing operation is carried out, however, in accordance with chapter 3.2.3 of Recommendation G709, it will be inhibited for the subsequent three frames.

Block 9 is supplied with a POH PLSR signal having a frequency of 8 kHz from an external source. Based on the supplied POH PLSR signal, block 9 extracts SOH and POH of STM-⅓ and H1, H2 and H3 of TU-3, generates a read clock signal RCLK according to the positive or negative stuff of TU-3 and transmits the generated RCLK to block 6.

In synchronism with H1 through H4 pulses from block 9, block 7 inserts a pointer value generated by block 8 to renew the pointer indicative of the J1 location and outputs the data to an external circuit.

Block 10, which is a monitor and alarm circuit, monitors the signals such as LOP, AIS, etc. transmitted from block 4 and the writing and reading operations of a counter in block 6. If a failure of any in the monitored signals or operations is detected, block 10 outputs an alarm signal as pointer failure, PTR FAIL or PTH AIS.

Although one particular preferred embodiment of the present invention has been shown and described in detail, it should be understood that various changes and modifications may be made therein without departing from the scope of the appended claims.

What is claimed is:

1. An apparatus for renewing pointers of STM-1 signals received from one or more sources N at a network node interface of synchronous digital hierarchy, effecting a cross-connection between received N signals of STM-1 signal form and an asynchronous signal transmitted from a local station at a rate of 34 Mbit/s or lower in VC signal format, and transmitting each signal as an STM-1 signal, said apparatus comprising:
   a memory module for storing inputted data, all of said data being demultiplexed form received N signals of STM-1 format or mapped from an asynchronous VC signal from said local station, as a format of one-third of an STM-1 signal, that is, an STM-⅓ signal of a format of blocks of 9 rows×90 bytes, composed of a section overhead of 8 rows×3 bytes, an AU pointer of one row of three bytes, and a payload in TU-3 format in 9 rows×87 bytes;
   input pointer analyzing means for detecting a TU-3 pointer from each AU pointer of the respective STM-⅓ signals of said inputted data and analyzing positive or negative stuff of TU-3 level and values of the AU and TU pointers inputted and stored in said memory module;
   TU pointer generating means for generating a value for a TU pointer replacing the value of the AU pointer from said memory module and the value of the TU pointer detected by aid input pointer analyzing means; and
   means for renewing the value of the TU pointer with the value for the TU pointer generated by said TU pointer generating means, and outputting the stored data with all AU pointers set to one constant value between zero (0) and seven hundred eighty-two (782).

* * * * *

UNITED STATES PATENT AND TRADEMARK OFFICE
CERTIFICATE OF CORRECTION

PATENT NO. : 5,331,630

DATED : July 19, 1994

INVENTOR(S) : Fujita et al.

It is certified that error appears in the above-identified patent and that said Letters Patent is hereby corrected as shown below:

On the title page, item 73, Assignee, change "Nec" to --NEC--.

Signed and Sealed this

Eleventh Day of October, 1994

Attest:

BRUCE LEHMAN

Attesting Officer

Commissioner of Patents and Trademarks